Feb. 14, 1961 H. LEFLON 2,971,256
FASTENERS FOR CONVEYOR BELTS AND THE LIKE
Original Filed Oct. 26, 1954
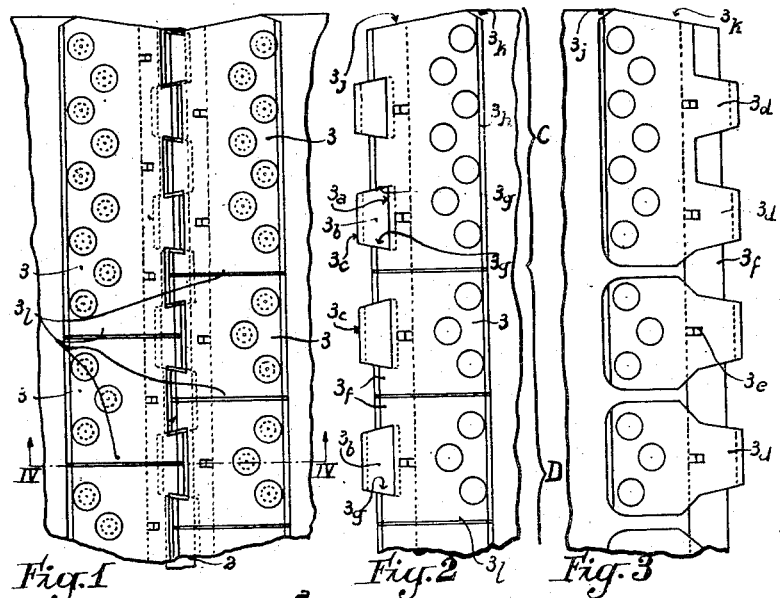
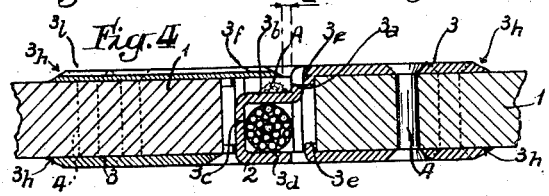
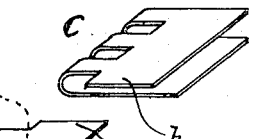
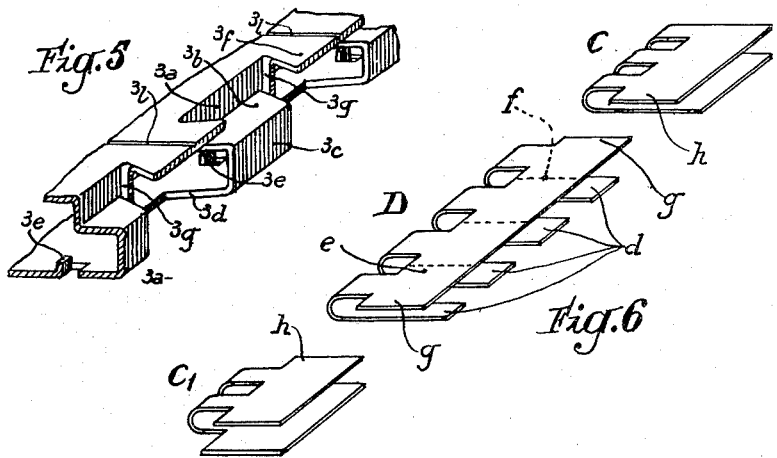
INVENTOR.
Henri Leflon
BY
Alexander Dowell
ATTORNEYS 
United States Patent Office 2,971,256
Patented Feb. 14, 1961

2,971,256

FASTENERS FOR CONVEYOR BELTS AND THE LIKE

Henri Leflon, 11 Rue Laperouse, Tangiers, Morocco

Original application Oct. 26, 1954, Ser. No. 464,705, now Patent No. 2,896,282, dated July 28, 1959. Divided and this application Oct. 13, 1958, Ser. No. 766,983

Claims priority, application France Feb. 9, 1954

6 Claims. (Cl. 29—411)

My invention relates to the method of making fasteners for conveyor belts and the like, of the kind comprising two intermeshing U-shaped members adapted to be secured on the transverse ends of the belt as for instance by rivets, these members being hinged together by means of a transverse articulation pin. The present application is a division of my prior application Serial No. 464,705, filed October 26, 1954, which has now matured into U.S. Letters Patent No. 2,896,282, issued July 28, 1959.

Conveyor belts are generally supported by idlers arranged in such a manner as to impart to the operating side of the belt a trough-shaped cross-section in order that the raised edges thereof may retain the material being carried. The belt should therefore be transversely flexible and of course the fastener should not impair this transverse flexibility. This is generally obtained by making each member of the fastener of a succession of separate elements regularly spaced along the corresponding transverse ends of the belt. And since the mounting of such separate elements at the proper position would practically require a punching guide or jig, it has been proposed to connect the successive elements with each other on one side only of the belt by means of bridge portions of somewhat reduced strength, as for instance by being provided with grooves, holes or similar arrangements. With such a disposition the fastener initially comprises two relatively rigid members which may be easily secured on the belt ends, but the bridge portions are flexible enough to permit the belt to assume its trough-shaped cross-section and moreover they break rapidly under the action of the repeated bending, whereby each member becomes formed of a succession of separate elements.

An important subsidiary advantage of this form of belt fastener is that it can be manufactured from steel band in the form of an endless succession of identical elements with connecting bridge portions. When it is desired to prepare a fastener for a belt of determined width, two lengths are cut from this succession and are mounted on the belt ends. This avoids the provision of a particular die and punch for each belt width.

Another problem arising in connection with fasteners for conveyor belts is the risk of the fastener being damaged by striking rigid stationary bodies during operation of the belt. It often occurs in mines that a conveyor belt runs too close to a fixed frame or support and that it comes into contact with the latter under the action of its unavoidable lateral oscillation. Also a tool or other solid body may be inadvertently placed too close to the conveyor belt. In such cases the lateral elements of the fastener are rapidly bent, raised, torn or broken and the fastener is generally to be changed as a whole if reliable operation is desired.

This inconvenience of the known fasteners may be avoided or reduced by re-inforcing the lateral elements of each member of the fastener, as for instance by making these elements of greater length, or of increased thickness, or of a metal of higher quality, or further by securing the said elements on the belt ends by an increased number of rivets, or still further by reducing the pitch of the intermeshing portions of the elements hinged with each other along each end edge of the belt, or by a proper combination of these means. It is also of advantage to cut obliquely the lateral edges of these end elements to avoid any sharp angle.

But whatever may be the means used to re-inforce the end elements of the fastener, these end elements are quite different from the intermediate ones and it becomes therefore impossible to cut the fastener members from an endless succession of identical elements. If the end elements were made of a metal of the same quality and of the same thickness as the intermediate ones, it would still be possible to manufacture each member as a rigid unit by means of appropriate punching tools, but of course this would require a set of tools for each belt width, which would be too expensive in most cases. Moreover this would suppress some interesting possibilities, such as making the end elements of higher grade steel or of thicker sheet-metal.

The procedure which has been hitherto followed has consisted in making the end elements as separate units. Each member of the fastener thus comprises three portions, namely a central unit formed of a succession of intermediate elements, and two separate end elements. These three portions have of course to be separately secured on the belt ends and this operation either necessitates the use of a punching guide to make sure that the end elements will be secured on the belt at the proper position, or requires a very careful and skilled operator to properly position these end elements and to mark the points where the belt should be punched to receive the corresponding rivets.

The main object of the present invention is to avoid these inconveniences and to provide a fastener with re-inforced ends which will be easily disposed on the belt ends by an average operator without any kind of particular punching guide or the like.

In accordance with this invention each member of a fastener for a conveyor belt comprises a central unit in the form of a succession of U-shaped elements connected with each other by bridge portions on one side only of the said unit, and two reinforced end elements which are welded to the adjacent elements of the said unit on one side only of the latter.

The welded connection between each end element and the adjacent intermediate element is preferably weaker than the adjacent portions of either the end element or the intermediate element, in order to bend easily in operation and to break rapidly under the action of repeated bending. In other words the welded connection between each end element and the next intermediate element is so realized as to be the equivalent of the weakened bridge portions which connect the successive intermediate elements. This may be obtained by reducing the thickness of the edges to be welded, as by chamfering, and by avoiding any substantial extra-thickness at the weld. There is thus formed at the junction between the end element and the adjacent intermediate element a depression or groove quite similar to the grooves provided in the bridge portions between the successive intermediate elements which form the central unit of the fastener member.

In the annexed drawing:

Fig. 1 is a fragmental plan view showing the upper side of a hinged fastener for a conveyor belt, established in accordance with this invention.

Fig. 2 is a fragmental plan view showing the right-hand member of the fastener of Fig. 1.

Fig. 3 is a fragmental bottom plan view corresponding to Fig. 2.

Fig. 4 is an enlarged cross-section through line IV—IV of Fig. 1.

Fig. 5 is a fragmental perspective view illustrating the left-hand side member of the fastener of Fig. 1.

Fig. 6 is a very simplified diagrammatic representation illustrating the three constituents of a fastener member in accordance with the present invention.

The fastener illustrated in Figs. 1 to 5 is adapted to be secured on the ends 1 (Fig. 4) of a conveyor belt of large width which runs with its edges raised with respect to the central portion thereof to form a trough supporting the material handled, as for instance coal, while the end pulleys are substantially cylindrical. Such an operation requires a high transverse flexibility and the fastener should not impair same. The fastener is of the hinged type and it comprises two halves or members which fit together and which are articulated with each other by means of a length 2 of steel cable forming a flexible hinge pin.

Each half is formed of a U-shaped member 3 adapted to be fitted on the corresponding belt end, the latter being clamped between the two flanges or jaws of member 3. The upper jaw, illustrated in Figs. 1 and 2, extends continuously transversely of the belt, while the lower jaw is discontinuous, as illustrated in Fig. 3, and is formed of a succession of elements. It may thus be considered that each fastener member is formed of a succession of elements which are connected with each other by bridge portions on one side only of the fastener, namely the upper side illustrated in Figs. 1 and 2, while they are separated from each other by free spaces on the other side or lower side of the fastener, as illustrated in Fig. 3.

Moreover each bridge portion is formed with a line of depression or groove 3l extending longitudinally of the belt above the space which separates two successive elements on the lower side or jaw of each member. These grooves or depressions 3l constitute lines of lesser mechanical strength where the bridge portions break rapidly in use under the effect of the repeated bendings to which the fastener is submitted in use. Each member is therefore initially a relatively flexible but inextensible unit, which is easily disposed and secured on one end of the belt, as by rivets, and after a relatively short time it becomes formed of a succession of entirely separate elements, which have no influence whatever on the transverse flexibility of the belt.

The end of each member which projects beyond the belt end alternately comprises unrecessed parts which surround the articulation pin 2, as indicated at 3a, 3b, 3c, 3d in Fig. 4, and recessed parts which do not surround pin 2 to provide spaces to receive the unrecessed pin-surrounding parts of the other member 3, the two members being in mutual interengagement. Each unrecessed part comprises, starting from the upper jaw of the right-hand member 3 in Fig. 3, a substantially vertical downwardly directed shoulder portion 3a, a substantially horizontal portion 3b projecting in front of shoulder portion 3a and above pin 2, a substantially vertical portion 3c extending downwardly in front of pin 2 and a horizontal lower portion 3d extending rearwardly in the horizontal plane of the lower jaw of member 3. A number of tongues 3e are cut in the upper and lower jaw and are turned inwardly to form abutments limiting the engagement of the end of the belt into the member under consideration to facilitate proper positioning of the said member on the belt end. In some cases shoulder portions 3a may form such abutments, either alone or in cooperation with tongues 3e provided in the lower jaw.

Each recessed part of each member 3 which does not surround the hinge pin 2 comprises an upper horizontal extension 3f which stops short of the facing shoulder portion 3a of the other member 3 to overlap the horizontal portion 3b of the latter in order to prevent passage of pulverulent material, as for instance coal dust. The free space a which must be left between extension 3f and shoulder portion 3a is sufficiently small for this purpose. Moreover, even if for any reason this space a is somewhat wider, as for instance with a worn hinge pin or with a hinge pin of too small diameter, the pulverulent material accumulates on the horizontal portion 3b as shown at A and forms thereon a mass or plug which stops the passage.

The transverse edges of members 3 are preferably bevelled, as indicated at 3h, whereby a solid body or obstruction may slide on the fastener without raising the edges thereof.

The lateral ends of members 3 are re-inforced with respect to the intermediate part thereof. In the embodiment illustrated this is obtained by making of greater length the end elements of each member 3, as indicated at C in Fig. 2, with respect to the elements of the intermediate zone D. Such an increase in the length of the end elements C does not affect the transverse flexibility of the belt because in practice a conveyor belt is transversely curved in V or U shape, i.e. only in the central or intermediate zone, its marginal portions remaining substantially rectilinear in cross-section. It will also be observed that in the end members C the pitch of succession of unrecessed parts which surround the hinge pin, and of recessed parts which do not surround the latter is somewhat smaller than in the intermediate zone D; in other words members 3 are attached to pin 2 and to each other in zone C at somewhat closer intervals than in zone D, which constitutes a further re-inforcement of the fastener. Further in zone C members 3 may be made of a higher grade steel, or of a thicker metal.

The lateral edges of members 3 are cut obliquely, as indicated at 3f and 3k in Figs. 1 to 3 to avoid any sharp angle along the edges of the belt. With such an arrangement, if the belt slides laterally against a solid body, as it often occurs in mines, the latter is not liable to damage the fastener.

From the above description it will be appreciated that each member of the fastener may be considered as a flexible but inextensible unit formed of a succession of elements, namely, starting from an end of the member under consideration, one special reinforced end element, a number of intermediate elements which depends upon the width of the belt, and a second special reinforced end element. Such a member cannot be cut from an endless succession of elements, since if the intermediate elements are quite identical with each other, they are entirely different from the re-inforced end elements. If the end elements were made of the same metal as the intermediate elements and with the same thickness—which would limit the possibilities and the advantages of re-inforcing the end elements—it would be possible to manufacture the fastener member by means of an appropriate set of dies and punches, but this would require a set of tools for each type of fastener and would therefore be an expensive method. Moreover, if it is desired to make the end elements of a higher grade metal and/or with an increased thickness, this manufacturing method is quite inoperative.

In accordance with the present invention each fastener member is manufactured as follows:

There is first prepared a succession of U-shaped intermediate elements connected with each other by bridge portions on one side only of the succession of elements. This succession is preferably obtained from a band of sheet metal, by punching and folding. Its length is indefinite and may be equal to the length of the band from which the said succession is cut, or only to a portion of this latter length.

There is also prepared an indefinite number of re-inforced end elements such as element C of Fig. 2, these elements being in the form of separate parts. It will be appreciated that there should exist two types of end elements, namely one for each end of a fastener member. These end elements may be manufactured by punching and folding from any desired sheet-metal, quite irrespective of the sheet-metal used to prepare the indefinite succession of intermediate elements.

For a given fastener member there is cut in the indefinite succession of intermediate elements a length comprising an appropriate number of such elements and a re-inforced end element is secured by welding at each end of this length, the weld being effected on one side of the member, preferably on the side which already comprises the bridge portions between the succesive intermediate elements, in such a manner that the weld itself should form a bridge portion between each re-inforced end element and the adjacent intermediate element.

In the very diagrammatic and simplified representation of Fig. 6 there are shown the three constituents of a fastener member according to the present invention. D designates as in Fig. 2 the central succession of intermediate members, here referenced $d$, the said members being connected by bridge portions $e$ on one side only of the U-shaped cross-section, such bridge portions being weakened by grooves indicated by the dotted lines $f$. This succession of four intermediate elements $d$ has been cut along grooves $f$ from an endless succession of elements, as above explained. Succession D therefore comprises at its ends and on one side only of the U-shaped cross-section, projections $g$ which correspond to one half of a bridge portion such as $e$. C and $C_1$ designate the re-inforced end elements which have been prepared independently of succession D. As illustrated each end element has on one side of the U-shaped cross-section a projecting part $h$ which is the equivalent of projections $g$ of the central succession D.

In accordance with the present invention projections $h$ and $g$ are welded to each other at each end of the central succession D to constitute a substantially flexible but inextensible fastener member, the weld being so effected as to leave a line of lesser mechanical strength between each end member C or $C_1$ and the central succession D.

I claim:

1. A method for the manufacture of belt fasteners of the type comprising two intermeshing fastener members hinged with each other, more particularly for conveyor belts, comprising the steps, first, of forming an elongated strip having a succession of fasteners of U-shape integral with said strip; secondly, of forming reinforced end elements having a succession of fasteners of U-shape integral with said elements; thirdly, of cutting a definite number of U-shaped fastener elements from said elongated strip having a succession of U-shaped fastener elements that are integral with the strip and are connected with each other on one side only of the U-shaped cross-section by frangible bridge portions, the successive elements being so spaced as to permit direct intermeshing of two such successions; and, fourthly, of welding a reinforced end element at each end of said succession cut from said elongated strip.

2. In a method as claimed in claim 1, said welding operation being effected on one side only of the U-shaped cross-section of the fastener member.

3. In a method as claimed in claim 1, said welding operation being effected only on the side of the U-shaped cross-section of the fastener member which comprises the bridge portions between the elements of said cut succession from said elongated strip.

4. In a method as claimed in claim 1, said welding operation being so effected as to leave a weakened zone in the portion connecting each of said reinforced end elements with said cut succession from said elongated strip.

5. In a method as claimed in claim 1, said welding operation being so effected as to leave a line of depression substantially transverse to the fastener member in the portion connecting each of said reinforced end elements with said cut succession from said elongated strip.

6. In a method as claimed in claim 1, said succession of a definite number of fastener elements being cut from said succession of indefinite length substantially midway of said bridge portions to leave at the ends of said succession of a definite number of fastener elements projecting portions having a length equal to one-half the length of said bridge portion, said reinforced elements being each provided with a projecting portion having a length also substantially equal to one-half the length of said bridge portions, and the projecting portions of said succession of a definite number of fastener elements being welded with the projecting portions of said reinforced end elements by their terminal edges.

References Cited in the file of this patent

UNITED STATES PATENTS

| | | |
|---|---|---|
| 1,662,639 | Disbro | Mar. 13, 1928 |
| 1,975,862 | Olsen | Oct. 9, 1934 |
| 2,219,165 | Nedal | Oct. 22, 1940 |
| 2,242,967 | Carlile | May 20, 1941 |
| 2,252,305 | Puschner | Aug. 12, 1941 |
| 2,277,758 | Hawkins | Mar. 31, 1942 |
| 2,468,503 | Lister | Apr. 26, 1949 |